July 22, 1969   W. F. KELLER   3,456,440
GAS GENERATING SYSTEM

Filed Nov. 9, 1966   2 Sheets-Sheet 1

INVENTOR.
Walter F. Keller
By Harold L. Fox
AGENT

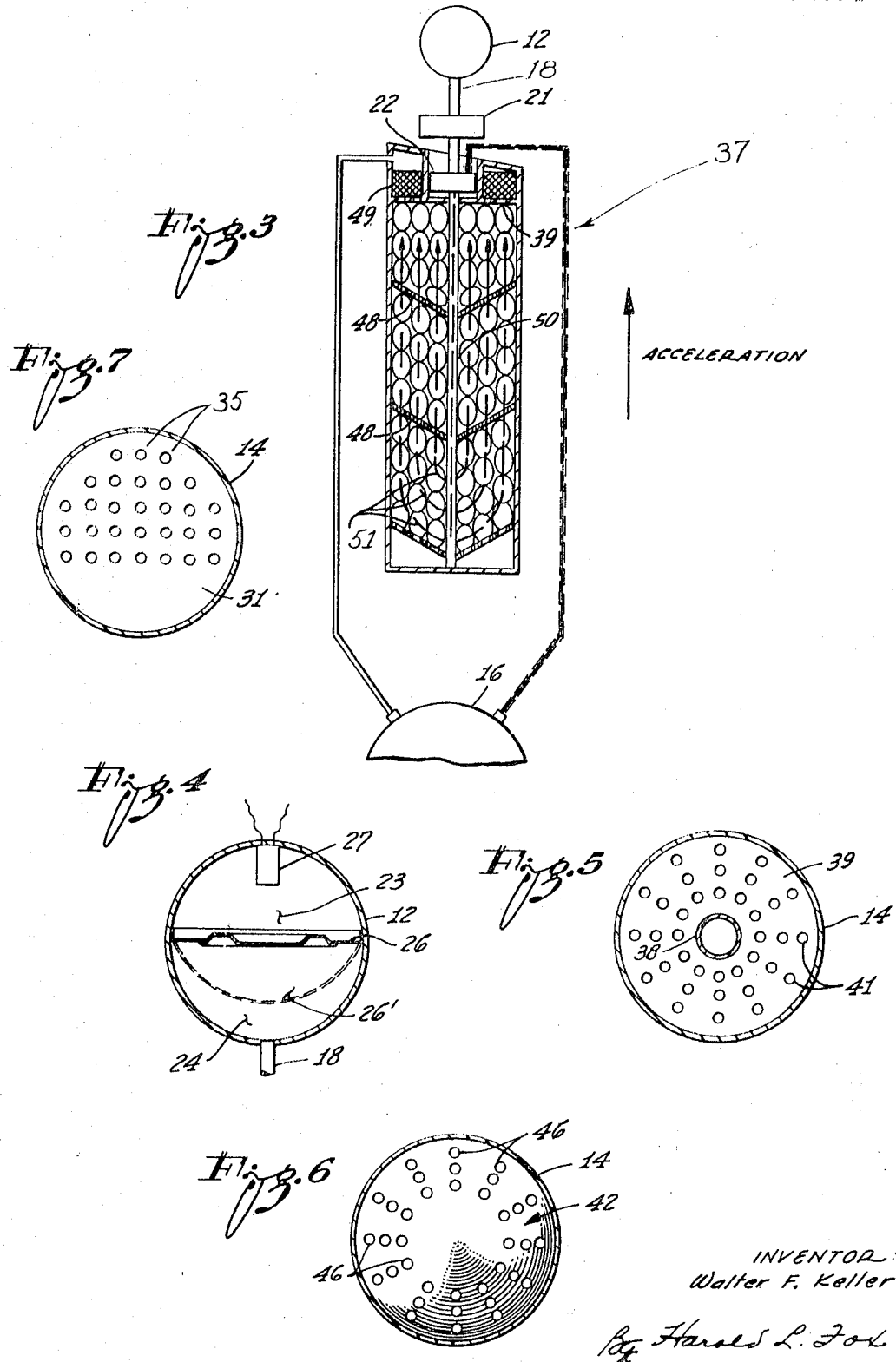

United States Patent Office 3,456,440
Patented July 22, 1969

3,456,440
GAS GENERATING SYSTEM
Walter F. Keller, Malibu, Calif., assignor to Northrop Corporation, Beverly Hills, Calif., a corporation of California
Filed Nov. 9, 1966, Ser. No. 593,196
Int. Cl. F02k 9/04; F23r 1/16
U.S. Cl. 60—39.48                                   6 Claims

ABSTRACT OF THE DISCLOSURE

Apparatus for pressurizing propellant tanks of space vehicles by a hypergolic reaction between a bed of discrete fuel grains and a fluid oxidizer flowing through the bed. The oxidizer flow is controlled by gas pressure in the propellant tanks.

---

This invention relates to gas generating systems and more particularly to a hot gas generating system embodying a controlled hypergolic reaction functioning to supply pressurized gas usable to displace liquid fuel from fuel cells or the like.

The concept of the gas generating system disclosed herein is discussed in connection with propellant tanks of rockets, missiles etc., however, the concept shown is merely for purposes of illustration and the system has many other and similar applications. Numerous systems and structures have been proposed for pressurizing the propellant tanks (cells) of space vehicles and the like. For example, propellant tanks may be pressurized by conducting a gas at super-atmospheric pressure thereto, by utilizing hot gases from the combustion of a solid or liquid charge in a gas generator, etc., however, these systems have inherent disadvantages that are well known to those experienced in the art.

In the present invention a hot gas generating system is disclosed functioning hypergolically to provide gas at super-atmospheric pressure acting to pressurize propellant tanks of a space vehicle. The flow of pressurized gas is controllable in that it is responsive to fluid pressure in the tanks being pressurized, in other words the rate at which hot (pressurized) gas is generated is responsive to pressure in the vehicle's propellant tanks. This arrangement insures controlled flow of pressurized gas providing on-off, throttled and retarded thrust chamber control and temperatures well within the operating limitations of the structure.

It is an object of the present invention to disclose a gas generating system adapted to supply gas for pressurizing propellant tanks of a space vehicle or the like which is controllable in that it is responsive to fluid pressures present in the propellant tanks of the vehicle.

Another object is to disclose a gas generating system adapted to supply gas for pressurizing the propellant tanks of a space vehicle or the like operating at a temperature well within the limitations of the structure employed.

Another object is to disclose a gas generating system adapted to supply gas for pressurizing the propellant tanks of a space vehicle or the like operating hypergolically, which encompasses a minimum of moving parts, is of simple construction and is practically free of malfunctioning tendencies.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 1 is a schematic view of one embodiment of the gas generating system disclosed herein utilized to pressurize the propellant tanks of a space vehicle or the like.

FIGURES 2 and 3 are views similar to FIGURE 1 and constitute other embodiments of the gas generating system of FIGURE 1.

FIGURE 4 shows the manner in which liquid in the oxidizing tank of FIGURES 1, 2 and 3 may be pressurized.

Figure 2:
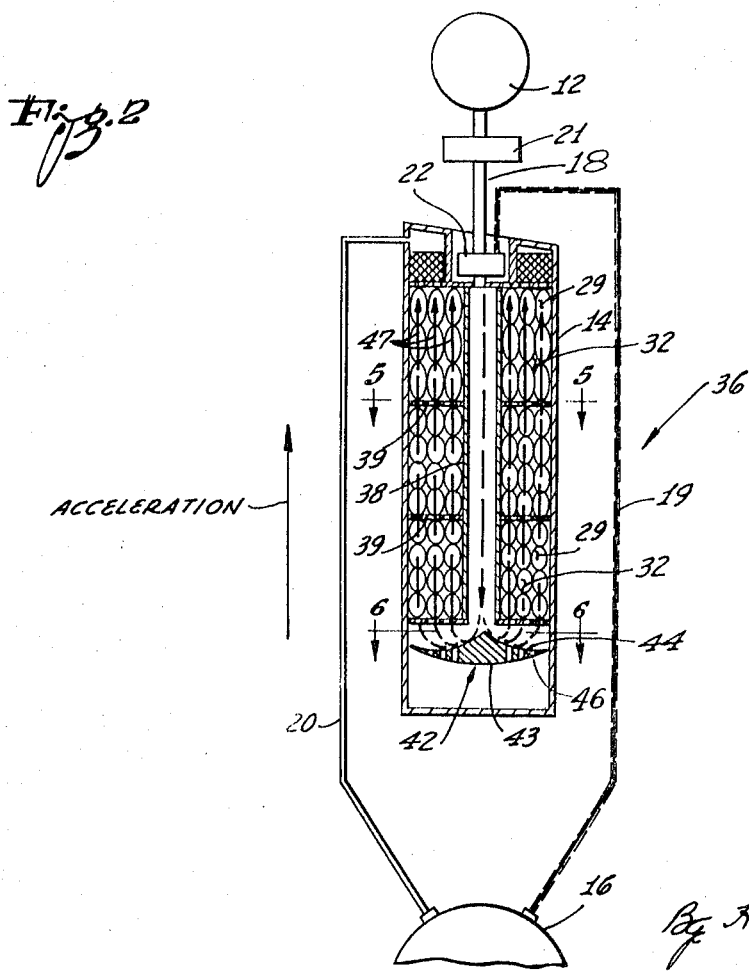

FIGURES 5 and 6 constitute sectional views as indicated by the lines 5—5 and 6—6, respectively, of FIGURE 2.

Figure 1:
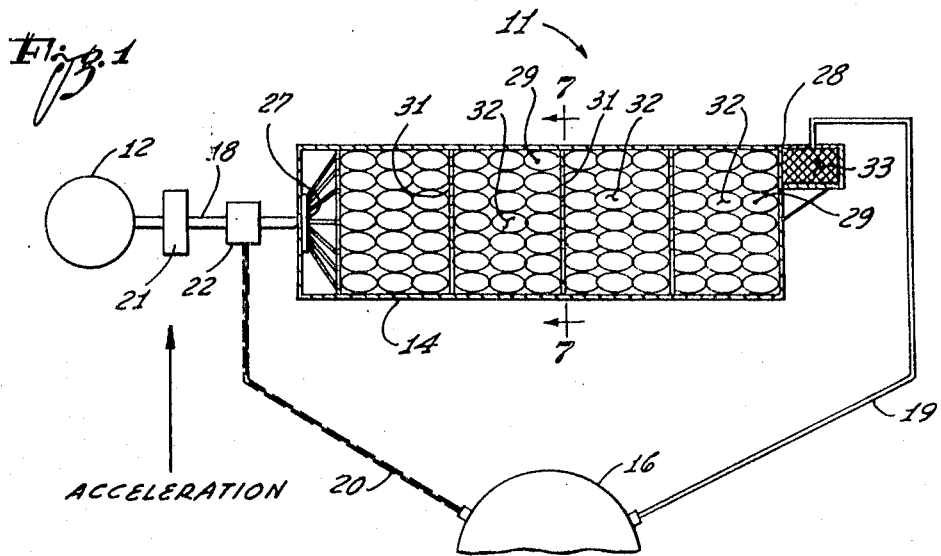

FIGURE 7 constitutes a sectional view as indicated by the lines 7—7 of FIGURE 1.

Referring to the drawings, the embodiment of the gas generating system 11 shown in FIGURE 1 includes an oxidizer tank 12, reaction chamber 14 and propellant tank 16. Fluid communication is maintained between the tanks 12 and 16 and the chamber 14 through the conduits 18 and 19 substantially as shown in FIGURE 1, conduits 18 and 19 having a fluid tight relation with the tanks 12 and 16 and the chamber 14. Mounted in the conduit 18 is an explosive actuated valve 21 and an on-off solenoid valve 22, the valve 22 being located adjacent the chamber 14. The valve 21 serves a dual function in that it arrests fluid flow from the tank 12 to the chamber 14 at such time as it is closed and provides means whereby the tank 12 may be filled with fluid. The valve 22 is solenoid actuated and is responsive to fluid pressure in the tank 16 rendering it open (allowing fluid flow through the conduit 18) at such times as fluid pressure in the tank 16 is within a predetermined range and is closed at such times as fluid pressure in tank 16 exceeds pressures defining a predetermined range. These signals are transmitted from the tank 16 to the valve 22 either hydrostatically or electrically via the member 20.

Oxidizer fluid contained in the tank 12 may be either a gas at high pressure or a fluid at its vapor pressure and is placed therein via the valve 21. If the fluid contained in the tank 12 constitutes a gas, pressurization is not necessary, however, if the oxidizer is a liquid, pressurization is required and pressurization thereof is effected by conventional means as shown in FIGURE 4. The tank 12 is divided into two sections 23 and 24 by an elastic diaphragm 26 which is secured to the walls of the tank in fluid tight relation. An explosive gas generating charge 27 is provided in the uppermost portion 23. By referring to FIGURE 4 it will be apparent that upon ignition of the charge 27, gas generated at a high pressure in the portion 23 will expand and deflect the diaphragm 26 resulting in the latter assuming a new position indicated by the numeral 26'. The expansion and deflection of the diaphragm 26 to the position 26' results in expelling of a quantity of oxidizer fluid contained in the portion 24 of the tank 12. Thus it is seen that either liquid or gaseous oxidizer may be utilized in the system 11.

Referring again to FIGURE 1, associated with the conduit 18 is a distribution head 27 located at the end where the conduit 18 enters the tank 14 and a manifold 28 is located at the opposite end. A plurality of individual fuel grains (slugs 29) are positioned in the tank 14 and are separated by a plurality of perforated plates or partitions 31, the tank 14 is thus divided into a plurality of individual sections 32. Solid compressed slugs 29 are shown in the present embodiments because of their design simplicity and inherent ruggedness, however, many other configurations are feasible including tubular, rod, shell and gains of variable cross-section. Mounted in the manifold 28 is a filter 33 functioning to separate entrained liquid and/or solid particles in the gas resulting from the chemical reaction as the oxidizer fluid enters the tank 14 and reacts with the fuel grains (slugs 29).

The upper portion of the partitions 31, as mounted in the tank 14, are perforated as indicated by the numeral 35 in FIGURE 7 while their lower portions are solid. This type of construction insures that the major part of molten products of combustion will be trapped while the perforations 35 allow the passage of oxidizer fluid to contact the fuel bed (slugs 29) and gas resulting therefrom to escape to the manifold 28. Solid products of combustion—if present—not removed by the solid portion of the partitions 31 will be removed by the filter 33.

The fuel grains (slugs 29) may be sodium azide, Teflon, ammonium oxalate, or other solid compounds which liberate heat and gas upon reaction with an oxidizer, but which will not sustain combustion in the absence of an oxidizer. In gaseous form, the oxidizer may be fluorine, oxygen difluoride, or other oxidizing gases acting hypergolic with the fuel. The liquid form of oxidizer may be chlorine trifluoride, nitrogen tetroxide, or other oxidizing liquids acting hypergolic with the fuel.

In the present embodiment sodium azide slugs have been selected for purposes of illustration only, a gas (fluorine) has been selected as the oxidizer fluid.

Components of the gas generating system 11 having been described, a better understanding thereof and the manner in which they cooperate will be forthcoming from the following description of its operation.

To start the generation of gas, the explosive charge controlling the valve 21 is first ignited, thus the valve 21 is opened. Oxidizer fluid now flows to the header 27 where it is distributed and contacts the fuel slugs 29 located in the section 32 of the tank 14 most adjacent the head 27. Upon contact of the fluorine gas with the azide slugs 29, a hypergolic reaction occurs at less than stoichiometric proportions as follows:

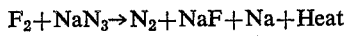
$$F_2 + NaN_3 \rightarrow N_2 + NaF + Na + Heat$$

As a result of this reaction, nitrogen gas is given off which flows through the tank and thence to the manifold 28 and subsequently to the tank 16 via the conduit 19 to pressurize the aforementioned tank. Molten sodium formed will be substantially trapped by the solid portion of the partitions 31 and additional particles entrained by the nitrogen gas will be separated therefrom as the latter passes through the filter 33, the reaction continuing as long as the valve 22 remains open. As fluid pressure in the tank 16 reaches a predetermined value, a signal will be transmitted to the valve 22—via the means 20—closing the latter until such time as fluid pressure therein falls below the aforementioned predetermined pressure, at this time the reaction described above will again be reactivated. Thus it will be seen that the aforementioned hypergolic reaction will be controlled in response to the fluid pressure within the tank 16.

The operation of the embodiments 36 and 37 shown in FIGURES 2 and 3, respectively, operate the same as the system 11 shown and described in connection with FIGURE 1 except the baffling arrangement is different and, therefore, the flow of gas therethrough is slightly different. Throughout the description of the three embodiments (FIGURES 1, 2 and 3), like numerals are used to identify like components. The gas generating systems of FIGURES 1, 2 and 3 are oriented with respect to acceleration force (see arrows so indicated) in proper manner for combustion products containing solids or liquid residuals, when none are present orientation is not critical.

Referring to FIGURE 2, a non-perforated tube 38 extends between the upper and lower partitions 39, the tube being in fluid tight relation with the conduit 18. The partitions 39 are perforated throughout as indicated by the numeral 41 in FIGURE 5. The tank 14 in FIGURE 2 also contains a baffle plate 42 (FIGURE 6) having a spherical shaped lower surface and an annular concave upper surface 44. The plate 42 is mounted below the tube 38 with the annular concave surface thereof having a concentric relation with respect to the tube 38. The outer portion of the plate 42 is perforated as indicated by the numeral 46. With the plate 42 mounted in the tank 14 in the manner described above, it will be apparent that oxidizer fluid and gas generated by oxidizer fluid contacting the slugs 29 will be caused to follow a course through the tank 14 as indicated by the arrows 47. Liquids resulting from the reaction of the oxidizer fluid and slugs 29 will pass through the perforations 46 and be trapped in the lower portion of the tank 14. Oxidizer fluid, as it egresses from the tube 38, is deflected upwardly through the bed of slugs 29 insuring a thorough and complete reaction between oxidizer fluid and slugs 29.

Referring to FIGURE 3, a tube 50, functioning to transmit and distribute oxidizer fluid to the fuel grains (slugs 29), is positioned axially of the tank 14. One end of this tube (tube 50) has a fluid tight relation with the valve 22 (conduit 18) and its other or lower end is closed by the lower wall of the tank 14. The lower portion of the tube 50 is perforated while its upper end is of solid construction, this construction provides egress and distribution of oxidizer fluid to the slugs 29.

In this embodiment, the fuel grains (slugs 29) are separated by a plurality of conical shaped partitions 48. As mounted the partitions 48 have an inverted relation in the tank 14 with their apices coinciding with the axis of the tube 50. The partitions 48 are perforated substantially as the partitions 39 (FIGURE 5). Thus the slugs 29 are urged by acceleration and the force of gravity into contact with the tube 50 regardless of their size. In other words the slugs 29 are urged into contact with the tube 50 as the slugs are reduced in size due to their reaction with the oxidizer fluid. Thus it becomes apparent that thorough and complete contact is maintained between the oxidizer fluid and the slugs 29 during the complete reaction therebetween. The major portions of liquids resulting from the above reaction pass through the perforations in the partitions 48 and are trapped in the lower portions of the tank 14. Other portions or solid particles, entrained by the gas generated in the tank 14, are separated therefrom as the gas passes through the filter 49. Arrows 51 indicate the flow of oxidizer fluid and generated gas as they pass through the chamber 14.

In each of the embodiments of the gas generating system (FIGURES 1, 2 and 3), the quantity and configuration of the individual fuel grains 29 is rigidly controlled rendering the proportions of oxidizer fluid and fuel grains consumed at a ratio well below stoichiometric. Thus the temperatures to which the combustion chamber 14 and tube 38 or 50 and conduit means 20 are subjected are well within the material limitations of the material of which these members are constructed, the reaction occurring at 2000° F. or less.

While in order to comply with the statute, the invention has been described in language more or less specific as to structural features, it is to be understood that the invention is not limited to the specific features shown, but that the method and means herein disclosed comprise several forms of putting the invention into effect, and the invention is therefore claimed in any of its forms or modifications within the legitimate and valid scope of the appended claims.

I claim:
1. Gas generating apparatus comprising:
  (a) a source of oxidizer fluid;
  (b) a combustion chamber which is cylindrical and includes a plurality of perforated sheet-like members dividing the interior thereof into a number of individual compartments;
  (c) a definite quantity of discrete fuel grains of specific configuration positioned in said combustion chamber adapted to provide a quantity of gas when said oxidizer fluid is admitted to said combustion chamber and contacts said fuel grains;

(d) conduit means extending between said source of oxidizer fluid and combustion chamber in fluid tight relation;
(e) valve means in said conduit means functioning intermittently to admit oxidizer fluid to said combustion chamber to contact said fuel grains;
(f) port means in said combustion chamber through which gas generated therein may escape;
(g) an elongated tube mounted in one end wall of said combustion chamber, one end of said tube communicating with said conduit means in fluid tight relation and functioning to effect contact between said oxidizer fluid and fuel grains and the other end of said tube being open and being spaced from the other end wall of said combustion chamber;
(h) and a circular plate including an annular concave surface mounted in said combustion chamber in opposing relation to the open end of said tube with said annular surface facing the open end of said tube and functioning to deflect and reverse the flow of oxidizer fluid flowing therefrom to intimately and completely contact said fuel grains.

2. Apparatus as set forth in claim 1:
(a) in which said elongated tube is cylindrical and is mounted in said combustion chamber with the axis thereof and the axis of said combustion chamber being coincident;
(b) said sheet-like members define truncated conical surfaces;
(c) said sheet-like members being mounted in said combustion chamber with the apices thereof coinciding with the axis of said tube and pointing away from the juncture of said tube with said conduit means;
(d) and said tube being perforated approximately its midpoint to said other end.

3. A gas generating system adapted to pressure the propellant tanks of rockets, missiles and the like comprising:
(a) a source of oxidizer fluid;
(b) a combustion chamber;
(c) a reservoir containing a liquid at a predetermined pressure;
(d) first and second conduit means extending between said source of oxidizer fluid and combustion chamber on one hand and between said combustion chamber and reservoir on the other, respectively, in fluid tight relation;
(e) a definite quantity of discrete fuel grains of specific configuration positioned in said combustion chamber adapted to react hypergolically with said oxidizer fluid, at a temperature suitable to the material limitations of said combustion chamber, and also to decompose under the heat of reaction to provide a quantity of gas at such times as said oxidizer fluid is admitted to said combustion chamber and contacts said fuel grains;
(f) and valve means in said first conduit means responsive to fluid pressure in said reservoir allowing controlled amounts of said oxidizer fluid to enter said combustion chamber and contact said fuel grains at such times as the fluid pressure in said reservoir falls below said predetermined pressure providing said controlled reaction.

4. A gas generating system as set forth in claim 3:
(a) in which said combustion chamber is cylindrical and includes a plurality of perforated sheet-like members dividing the interior thereof into a number of individual compartments;
(b) and an elongated tube mounted in said combustion chamber one end thereof communicating with said first conduit means in fluid tight relation and functioning to effect contact between said oxidizer fluid and fuel grains.

5. A gas generating system as set forth in claim 4:
(a) in which the other end of said tube is open and is spaced from an end wall of said combustion chamber;
(b) a circular plate including a portion defining an annular concave surface;
(c) and said circular plate being mounted in said combustion chamber in opposing relation to the open end of said tube with said annular surface facing the open end of said tube and functioning to deflect and reverse the flow of oxidizer fluid flowing therefrom to intimately and completely contact said fuel grains.

6. A gas generating system as set forth in claim 4:
(a) in which said elongated tube is cylindrical and is mounted in said combustion chamber with the axis thereof and the axis of said combustion chamber being coincident;
(b) said sheet-like members define truncated conical surfaces;
(c) said sheet-like members being mounted in said combustion chamber with the apices thereof coinciding with the axis of said tube and pointing away from the juncture of said tube with said conduit means;
(d) and said tube being perforated from approximately its midpoint to said other end.

References Cited
UNITED STATES PATENTS

| | | | |
|---|---|---|---|
| 3,101,589 | 8/1963 | Hamrick | 60—220 |
| 3,166,898 | 1/1965 | Hoeptner | 60—39.47 |
| 3,203,172 | 8/1965 | Sutherland | 60—219 |
| 3,214,906 | 11/1965 | Coleal | 60—39.48 |
| 3,231,002 | 1/1966 | Lehrer | 60—39.48 |
| 3,274,775 | 9/1966 | Berton | 60—39.47 |
| 3,315,472 | 4/1967 | Moutet | 60—251 |

MARTIN P. SCHWADRON, Primary Examiner

D. HART, Assistant Examiner

U.S. Cl. X.R.

60—251